(12) United States Patent
Yamazaki

(10) Patent No.: US 7,133,559 B2
(45) Date of Patent: Nov. 7, 2006

(54) IMAGE PROCESSING DEVICE, IMAGE PROCESSING METHOD, IMAGE PROCESSING PROGRAM, AND COMPUTER READABLE RECORDING MEDIUM ON WHICH IMAGE PROCESSING PROGRAM IS RECORDED

(75) Inventor: Tsutomu Yamazaki, Odawara (JP)

(73) Assignee: Minolta Co., Ltd., Osaka (JP)

(*) Notice: Subject to any disclaimer, the term of this patent is extended or adjusted under 35 U.S.C. 154(b) by 644 days.

(21) Appl. No.: 10/223,459

(22) Filed: Aug. 20, 2002

(65) Prior Publication Data

US 2003/0039394 A1    Feb. 27, 2003

(30) Foreign Application Priority Data

Aug. 27, 2001  (JP)  ............................. 2001-256568
Aug. 28, 2001  (JP)  ............................. 2001-258158
Jul. 5, 2002   (JP)  ............................. 2002-197876

(51) Int. Cl.
*G06K 9/48* (2006.01)

(52) U.S. Cl. .................... 382/199; 382/176; 382/266; 382/292

(58) Field of Classification Search ................ 382/176, 382/177, 199, 203, 266, 292
See application file for complete search history.

(56) References Cited

U.S. PATENT DOCUMENTS 5,872,864 A * 2/1999 Imade et al. ................ 382/176
6,049,635 A * 4/2000 Hayashi et al. ............. 382/266
6,188,790 B1 * 2/2001 Yoshikawa et al. ......... 382/194
7,043,080 B1 * 5/2006 Dolan ......................... 382/199
2003/0039394 A1 * 2/2003 Yamazaki .................... 382/176

FOREIGN PATENT DOCUMENTS

| JP | 9-186861 | 7/1997 |
| JP | 10-145602 | 5/1998 |
| JP | 2000-307869 | 11/2000 |

* cited by examiner

Primary Examiner—Gregory Desire
(74) Attorney, Agent, or Firm—Buchanan Ingersoll & Rooney PC

(57) ABSTRACT

The image processing device 1 generates edge image data from input image data, measures the distances between edge pixels in the main and secondary scanning direction, and interpolates between the edge pixels where said distances are less than a specified number of pixels in order to generate connecting edge image data of a group of connecting edge pixels. Next, it extracts a rectangular area circumscribing said group of connecting edge pixels as a local area, extracts diagonal direction edge components of said input image data that belong to said local area, and identifies said local area if the content of said diagonal direction edge components is within a specified range.

The image processing device according to the present invention makes it possible to identify character areas correctly even in case of character images on complex color area reproduced by a screen, etc., and also extract character areas without causing problems such as partially missing defective characters.

33 Claims, 16 Drawing Sheets

[ BINARY THRESHOLD VALUE FOR PIXEL IN QUESTION P(I J) = P(2 2)]
= MAX (P(0 0) P(4 0) P(0 4) P(4 4)) − OFFSET

EXTRACT

FIG. 14

BINARY IMAGE DATA opportunity to devoted exclusively to quantitative research dominate market research for the video and analysis for video products. We see two industry This new Troy division will main target markets:
- Producers who want to test concepts prior to taping.
- Video companies who want to test variations in lines for videos which have already been taped. VideoSaver has already gained high visibility of Jim Johansen as marketing with the hiring director. (Jim's work in researching the market for a recent video

*Ordering Information*

Professional Development System (CD) ...7771-10
Full Development System(CD)..............7771-11
Base Package(CD).............................7771-12
Industrial Automation Server................7771-13

RGB IMAGE DATA opportunity to devoted exclusively to quantitative research dominate market research for the video and analysis for video products. We see two industry This new Troy division will main target markets:
• Producers who want to test concepts prior to taping.
• Video companies who want to test variations in lines for videos which have already been taped.
VideoSaver has already gained high visibility with the hiring of Jim Johansen as marketing director. *Jim's work in researching the market for a recent video*

Ordering Information

Professional Development System (CD) ...7771-10
Full Development System(CD)... ......7771 11
Base Package(CD)... ...7771 12
Industrial Automation Server.. ............7771-13

☐ Objectives and the ability to quantify results
☐ Expertise in consumer research and analysis

IMAGE PROCESSING DEVICE, IMAGE PROCESSING METHOD, IMAGE PROCESSING PROGRAM, AND COMPUTER READABLE RECORDING MEDIUM ON WHICH IMAGE PROCESSING PROGRAM IS RECORDED This application is based on Japanese Patent Application Nos. 2001-256568 filed on Aug. 27, 2001, 2001-258158 filed on Aug. 28, 2001 and 2002-197876 filed on Jul. 5, 2002, the contents of which are hereby incorporated by reference.

BACKGROUND OF THE INVENTION

1. Field of the Invention

The present invention relates to an image processing device for identifying areas of image data that include character images without relying on a character recognition process.

2. Description of Related Art

The process of separating an area containing only character images (hereinafter called "character image area") from image data of a document and extract image data consisting only of pixels which constitute character images (hereinafter called "character image data") has hitherto been carried out by using the character recognition process. However, since the character recognition process depends on the OS (operating system) and has need of a dictionary file, it has not been suitable for being built into a scanner or a dedicated image processing device.

On the other hand, a method of identifying character image areas without relying on the character recognition process is disclosed by JP-A-09-186861. Said method has a problem that, since it makes a judgment whether an extracted area is a character image area based on a premise that the peripheral areas of a character image is monochromatic and most of its frequency components consist of direct current components, characters on colored areas reproduced in screens, for example, such as on magazine pages have peripheral areas that their frequency characteristic lacks said features thus making said method unsuitable for properly extracting character image areas. Moreover, since the method identifies an area by a unit of specified block (8×8 DCT transformation), so that if it makes a misjudgment, it can end up generating a partially defective character, or a strange-looking image when placed in a string of characters.

On the other hand, in an image processing of document image data, it is not necessary to extract a document image area as an area containing only character images but rather it is sufficient to extract it as an area containing mainly character images (hereinafter called "character image containing area"), and an image processing to a document image data can be efficiently and simply carried out, in some cases, by applying an image processing suitable for character images to the character image containing areas thus obtained.

SUMMARY OF THE INVENTION

The present invention is made in consideration of the abovementioned problems existed in the prior art, and its intention is to provide an image processing device that is capable of identifying character image areas without relying on the character recognition process, correctly identifying character image areas even if they are character images on complex color areas reproduced by screen, etc., and extracting character image areas without causing problems such as partially losses of characters.

Another intention of the present invention is to provide an image processing device that is capable of extracting a character image containing area from input image data simply and quickly in accordance with a specified object area.

The above intentions can be obtained by the following means:

(a) An image processing device comprising:
an edge component extracting means for extracting diagonal direction edge components in an object area of input image data;
an edge component content calculating means for calculating the content of said diagonal direction edge components in said object area; and
a character area identifying means for identifying whether said object area is an area containing character images based on the content of said diagonal direction edge components.

(b) The image processing device described in claim 1 further comprising:
an edge image data generating means for generating edge image data from the input image data;
a connecting edge image data generating means for generating connecting edge image data by means of measuring the distances between edge pixels in a main scanning direction and a secondary scanning direction of said edge image data and interpolating between the edge pixels with distances less than a specified number of pixels to form a group of connecting edge pixels; and
a local area extracting means for extracting local area which is a rectangular area circumscribing said group of connecting edge pixels of said connecting edge image data; wherein,
said object area in which said edge component extracting means extracts diagonal direction edge components is said local area of said input image data, and
said character area identifying means identifies whether said local area is an area containing only character images based on the content of said diagonal direction edge components.

(c) An image processing method comprising:
a step (1) of extracting diagonal direction edge components in an object area of input image data;
a step (2) of calculating the content of said diagonal direction edge components in said object area; and
a step (3) of identifying whether said object area is an area containing character images based on the content of said diagonal direction edge components.

(d) The image processing method described in claim 12 further comprising:
a step (4) of generating edge image data from the input image data;
a step (5) of generating connecting edge image data by means of measuring the distances between edge pixels in a main scanning direction and a secondary scanning direction of said edge image data and interpolating between the edge pixels with distances less than a specified number of pixels to form a group of connecting edge pixels; and
a step (6) of extracting local area which is a rectangular area circumscribing said group of connecting edge pixels of said connecting edge image data; wherein,
said object area in which diagonal direction edge components is extracted in the step (1) is said local area of said input image data, and the step (3) is for identifying whether said local area is an area containing only character images based on the content of said diagonal direction edge components.

(e) An image processing program for causing an image processing device to execute:

a procedure (1) for extracting diagonal direction edge components in an object area of input image data;

a procedure (2) for calculating the content of said diagonal direction edge components in said object area; and a procedure (3) identifying whether said object area is an area containing character images based on the content of said diagonal direction edge components.

(f) The image processing program described in claim 23 further causing the image processing device to execute:

a procedure (4) for generating edge image data from the input image data;

a procedure (5) for generating connecting edge image data by means of measuring the distances between edge pixels in a main scanning direction and a secondary scanning direction of said edge image data and interpolating between the edge pixels with distances less than a specified number of pixels to form a group of connecting edge pixels; and a procedure (6) for extracting local area which is a rectangular area circumscribing said group of connecting edge pixels of said connecting edge image data; wherein, said object area in which diagonal direction edge components is extracted in the procedure (1) is said local area of said input image data, and the procedure (3) is for identifying whether said local area is an area containing only character images based on the content of said diagonal direction edge components.

(g) A computer readable recording medium on which image processing programs described in claims 23 through 33 are recorded.

"Area containing character images" herein is used as a term to mean the concept of both "character image area" (area containing only character images) and "character image containing area" (area containing mainly character images)."

BRIEF DESCRIPTION OF THE DRAWINGS

FIG. 14 is a diagram showing an example of the mask image data obtained through a binarization process for each character image area of the same input image data as in FIG. 6.

FIG. 15 is a diagram showing an example of character image data obtained by extracting pixels corresponding to the mask image data of FIG. 14 from the same input image date as in FIG. 6.

DESCRIPTION OF THE PREFERRED EMBODIMENTS

A preferred embodiment of the present invention will be described below in detail referring to the accompanied drawings.

Figure 1:
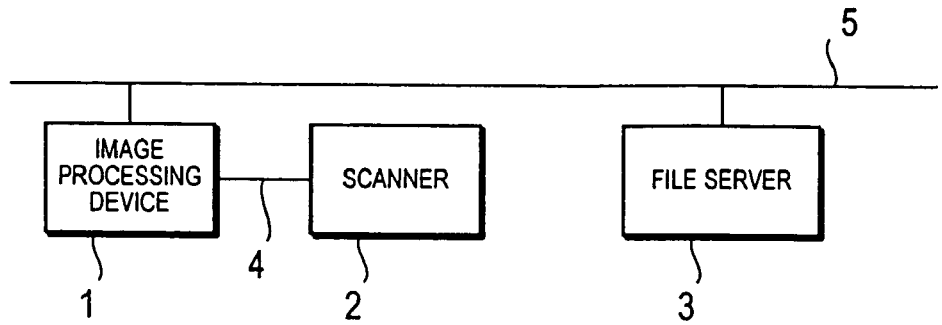
FIG. 1 is a block diagram showing the entire constitution of an image processing system that includes the image processing device according to the first embodiment of the present invention.

FIG. 1 is a block diagram showing the entire constitution of an image processing system that includes the image processing device according to the embodiment of the present invention. The image processing system is equipped with an image processing device 1, a scanner 2 that functions as an image input device, and a file server 3 that serves as an image output destination device, wherein the image processing device 1 and the scanner 2 are connected via a communication cable 4, while the image processing device 1 and the file server 3 are connected via a computer network 5 all communicable with each other. The types and number of devices that can be connected to the computer network 5 are not limited to those shown in FIG. 1.

Figure 2:
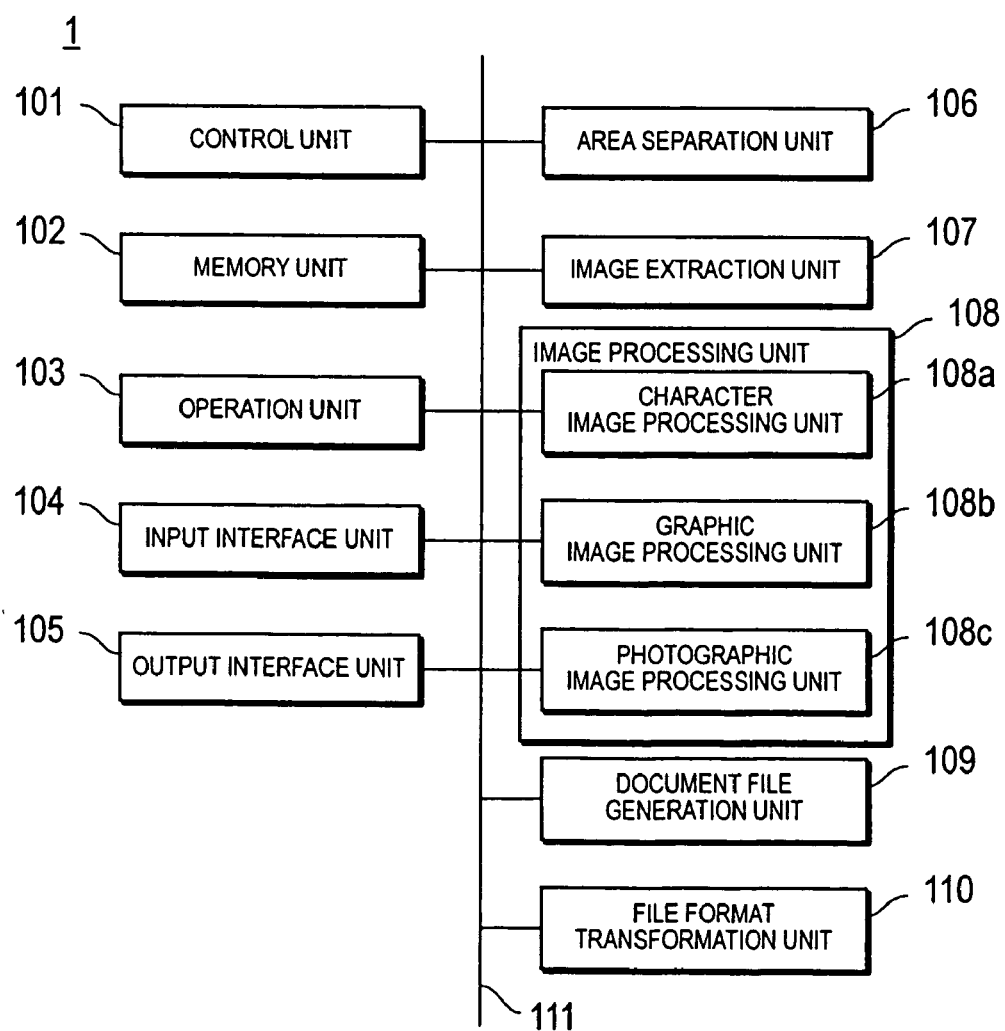
FIG. 2 is a block diagram showing the constitution of the image processing device 1 shown in FIG. 1.

FIG. 2 is a block diagram showing the constitution of the image processing device 1 according to the present embodiment. In FIG. 2, the image processing device 1 is equipped with a control unit 101, a memory unit 102, an operation unit 103, an input interface unit 104, an output interface unit 105, an area separation unit 106, an image extraction unit 107, an image processing unit 108, a document file generation unit 109 and a file format transformation unit 110, and they are all connected with each other via a bus 111 through which signals are exchanged.

The control unit 101 is a CPU and is in charge of controlling the abovementioned units, executing various arithmetic operations, etc. The memory unit 102 consists of a ROM for storing various programs and parameters in advance, a RAM for temporarily storing programs and data as a working area, a hard disk for storing various programs and parameters and temporarily holding image data obtained by image processing, etc.

The operation unit 103 consists of keys, an operating panel, etc., for setting image data transmission destinations and output file formats, and inputting operation start instructions. The image data transmission destinations are set up by inputting the IP addresses, host names and mail addresses of the image output destination devices. The output file formats are set up by selecting the file formats of the output files transmitted to the image output destination devices.

The input inter face unit 104 is an interface for accepting image data input from external image input devices and the output interface unit 105 is an interface for transmitting output files to external image output destination devices.

The area separation unit 106 executes the process of separating character image areas from input image data. The image extraction unit 107 executes the process of extracting character image data, graphic image data, and photographic image data from the input image data. The image processing unit 108 consists of a character image processing unit 108a, a graphic image processing unit 108b and a photographic image processing unit 108c, each of which applies appropriate image processing to character image data, graphic image data and photographic image data respectively. The document file generation unit 109 generates a document file by synthesizing character image data, graphic image data, and photographic image data after said image processing in an internal file format. The file format transformation unit 110 converts the document file generated in the internal file format into a specified output file format. The applicable file formats include document formats of various document generating software, and general purpose formats such as Postscript (registered trademark), PDF, JPEG, and TIFF.

The scanner 2 obtains image data by scanning the document, and transmits the obtained image data to the image processing device 1 via the connection cable 4. The connection cable 4 can be a cable based on standards such as a serial interface, for example, USB, or a parallel interface, for example, SCSI., as well as a proprietary dedicated cable.

The file server 3 is a computer that stores files received via the computer network 5, and transmits the stored files in accordance with transfer requests to other devices on the computer network 5.

The computer network 5 consists of a LAN that connects computers, peripheral equipment, network equipment, etc., in accordance with standards such as Ethernet (registered trademark), TokenRing, FDDI, etc., a WAN that consists of LANs connected with each other, etc.

Figure 3:
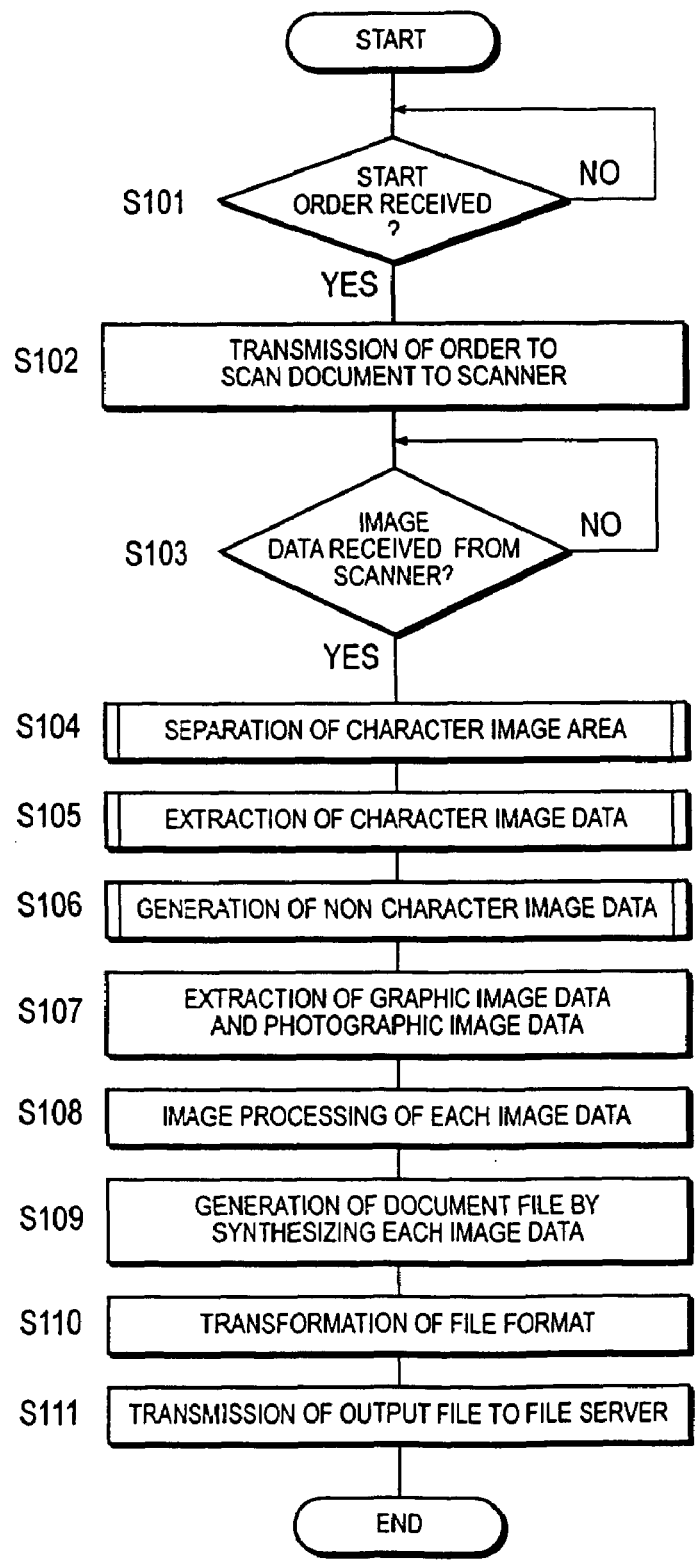
FIG. 3 is a flowchart showing the image processing procedure of the image processing device 1.

The outline of the operation of the entire image processing system in this embodiment will be described below. FIG. 3 is a flowchart showing the image processing procedure of the image processing device 1. In FIG. 3, the image processing device 1 stands by until a start order for image processing is received (S101:No). When a start order inputted by the user via the operation unit 103 is received (S101:Yes), it transmits a document scan order to the scanner 2 via the input interface unit 104 (S102), and waits until image data is received from the scanner 2 (S103:No). When a document scan order is received from the image processing device 1, the scanner 2 obtains image data by scanning the document set on a specified position, and transmits the obtained image data to the image processing device 1. The image processing start order can be inputted by another device on the computer network 5 or directly by the scanner 2, in which case the abovementioned steps S101 and S102 are omitted.

Upon receiving image data from the scanner 2 via input interface unit 104 (S103:Yes), the image processing device 1 stores the received input image data ("RGB image data") in the memory unit 102, identifies the character image area to be separated from the input image data according to a character image area separation procedure, which will be discussed later, by means of the area separation unit 106 (S104).

Furthermore, the image extraction unit 107 extracts character image data consisting only of pixels that constitute character images from the character image areas of the input image data in accordance with the character image data extraction procedure, which will be discussed later (S105), and generates non-character image data by replacing the character image constituting pixels extracted from the input image data with peripheral pixels in accordance with the non-character image data generating procedure, which will be discussed later (S106).

Next, the image extraction unit 107 extracts graphic image data and photographic image data from the non-character image data (S107). The methods for extracting graphic image data and photographic image data include a method of binarizing the obtained non-character image data, cutting out areas using white pixel portions as boundaries, and identifying whether a cutout area is a graphic area or a photographic area based on run length information, black pixel ratio information, etc., thus to extract graphic image data or photographic image data.

Next, the image processing unit 108 executes image processing of the character, graphic and photographic image data obtained as described above separately (S108). More specifically, it binarizes the character image data obtained by the character image processing unit 108a, applies the 1 bit data reversible compression process to it, and stores the result together with color information and position information into the memory unit 102. After applying the smoothing process, the color reduction process, etc. to the obtained graphic image data, the graphic image processing unit 108b applies the color image reversible compression process to it, and stores the result together with position information into the memory unit 102. Furthermore, after applying the resolution transformation to the obtained photographic image data, the photographic image processing unit 108c applies the color image non-reversible compression process to it and stores the result together with position information into the memory unit 102.

The document file generation unit 109 synthesizes the character image data, graphic image data and photographic image data obtained in the image processing described above based on their respective position information to generate document files in accordance with the internal file format (S109). The file format transformation unit 110 converts the obtained document file into a specified output file format (S110), and transmits the resultant output file to the file server 3 via the output interface unit 105 and the computer network 5 (S111).

Upon receiving an output file from the image processing device 1 via the computer network 5, the file server 3, in case of need, develops character image data and graphic image data from the received file, converts the character image data into character code data by applying the character recognition process, converts the graphic image data into vector data by applying the vector transformation process, synthesizes the converted data again with the photographic image data, and stores the document file obtained by converting the resynthesized file into a specified format into a specified directory of a memory device such as a hard disk. When a transfer request for said file is received from another device on the computer network 5, the stored file will be transferred to said device via the computer network 5.

Next, the procedures of the separationof character image areas, the extraction of character image data and the generation of non-character image data, which are characteristic to the image processing by the image processing device 1 according to this embodiment will be discussed in detail below.

Figure 4:
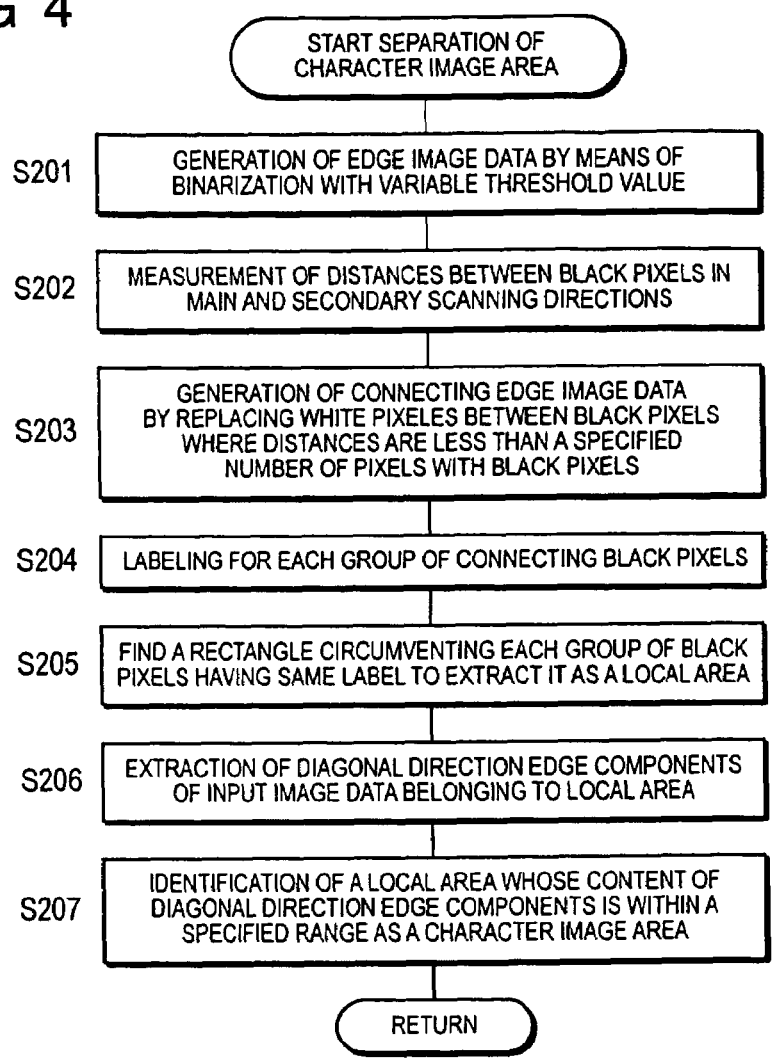
FIG. 4 is a flowchart showing the character image area separation procedure of the image processing device 1.
Figure 5:
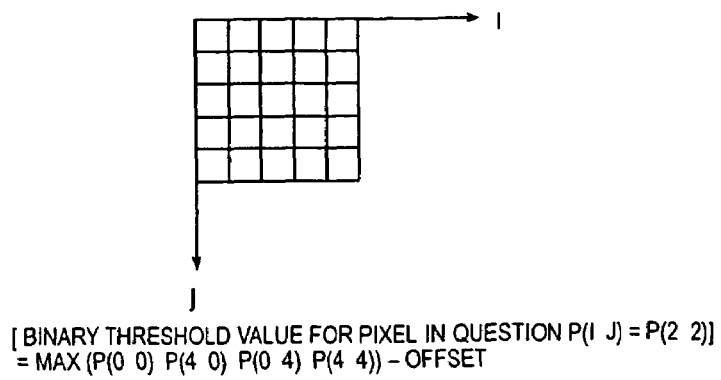
FIG. 5 is a diagram for describing the binarization process using the variable threshold value in the character image area separation procedure of the image processing device 1.
Figure 6:
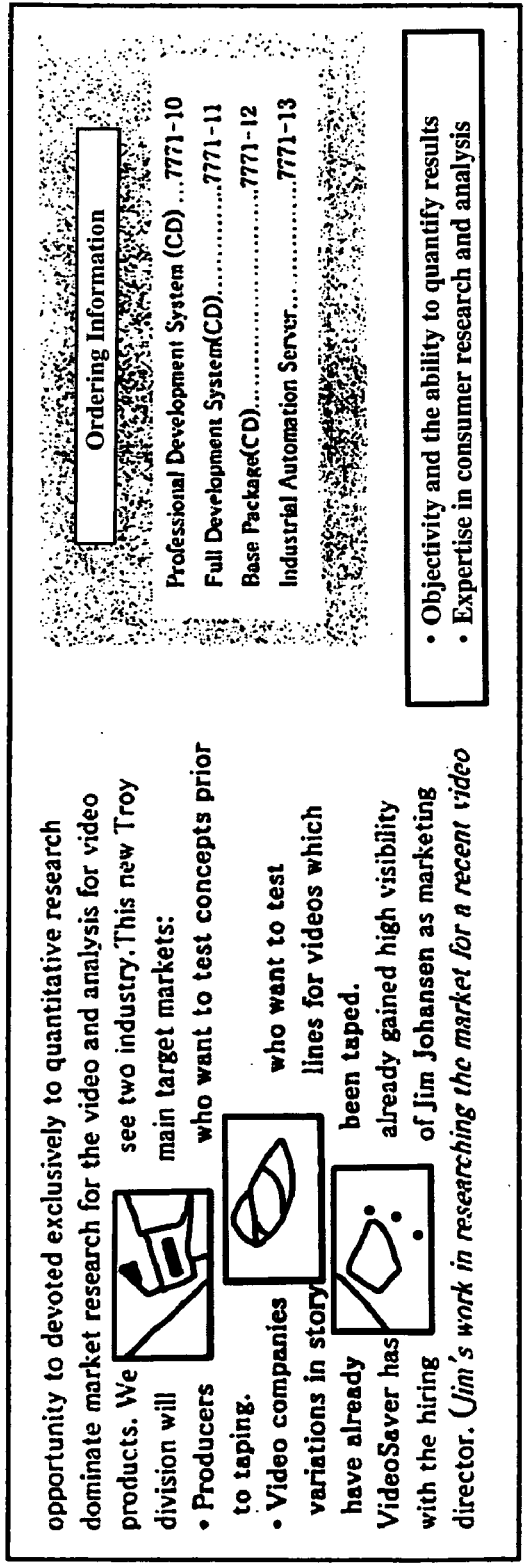
FIG. 6 is a diagram showing an example of brightness image data obtained by the scanner 2.
Figure 7:
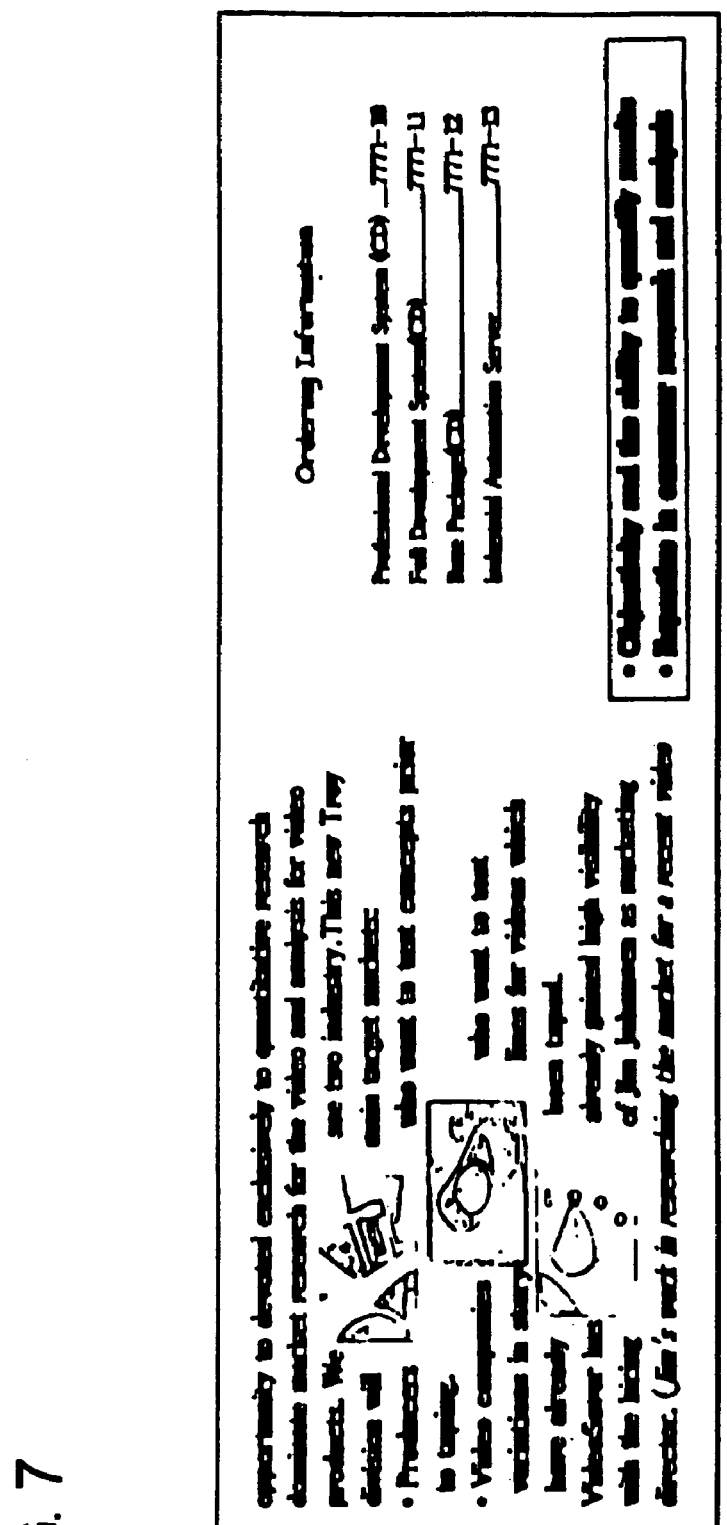
FIG. 7 is a diagram showing an example of connecting edge image data obtained by applying the binarization process using the variable threshold value and the connecting process of black pixels to the brightness image data shown in FIG. 6.

FIG. 4 is a flowchart showing the character image area separation procedure of the image processing device 1 according to this embodiment. In the character image area separation procedure, the image processing device 1 identifies to separate character image areas containing only character images from the input image data. In FIG. 4, the image processing device 1 applies the smoothing filtration process to the brightness image data of the input image data obtained from the scanner 2, generates edge image data by binarizing the resultant data according to a variable threshold value, and stores the resultant edge image data into the memory unit 102 (S201). The binarization process according to a variable threshold value is specifically a process of obtaining edge image data by binarizing the pixel-in-question using a value obtained by subtracting an offset value from the maximum value of the gradation values of the pixels in four corners of a 5×5 block as a threshold value as shown in FIG. 5. Next, the distance between black pixels in the main scanning direction of the edge image data thus obtained is measured (S202), and all the white pixels between black pixels under a specified distance are replaced with black pixels to generate connecting edge image data connected by black pixels in the main scanning direction (S203). Moreover, a similar procedure (S202 and S203) is repeated in the secondary scanning direction of the connecting edge image data and the connecting edge image data connected with black pixels both in the main scanning direction and the secondary scanning direction is obtained and stored in the memory unit 102. FIG. 6 is a diagram showing an example of an input image data obtained by the scanner 2, and FIG. 7 is a diagram showing an example of connecting edge image data obtained by applying the binarization process using the variable threshold value and the connecting process of black pixels to the input image data shown in FIG. 6. Thus, the image processing device 1 makes it possible to separate each bundle of character strings as an area by integrating character images, which are isolated in the input image data, by connecting adjacent black pixels.

Figure 8:
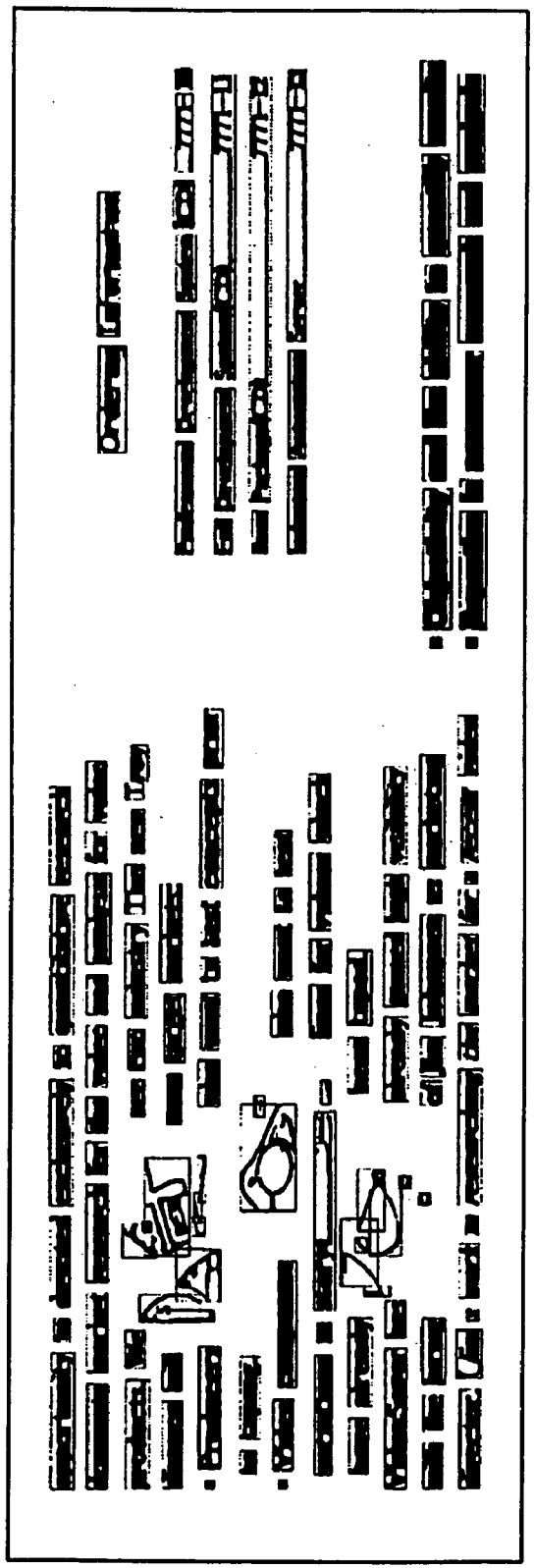
FIG. 8 is a diagram showing circumscribing rectangles obtained for each group of connecting black pixels of the same label in the labeling image data obtained from the connecting edge image data of FIG. 7.
Figure 9:
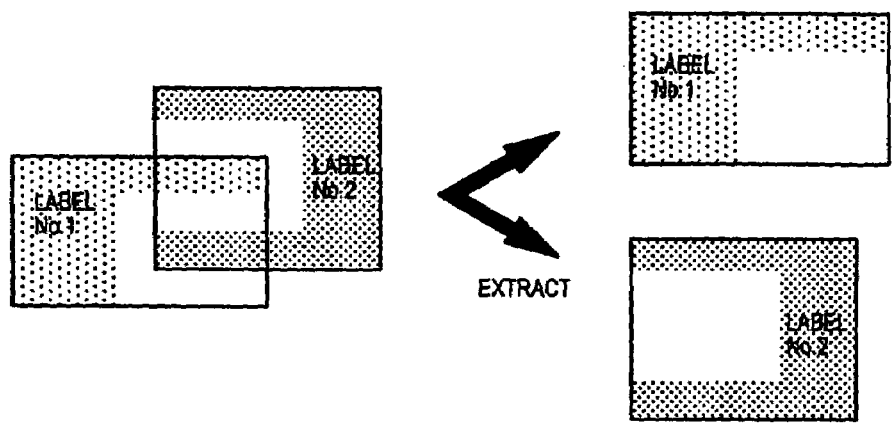
FIG. 9 is a conceptual drawing showing an example of circumscribing rectangles obtained for each group of connected black pixels of the same label shown in FIG. 7.

Next, labeling image data is generated by labeling each group of connected black pixels with reference to thus obtained connecting edge image data (S204). Positional information for the circumscribing rectangle for each connected group of black pixels with the same label is obtained from the labeling image data thus obtained, the area surrounded by said circumscribing rectangle is extracted as a local area, and the positional information of the local area thus obtained is stored into the memory unit 102 (S205). FIG. 8 shows circumscribing rectangles obtained for each group of connected black pixels with the same label in the labeling image data obtained from the connecting edge image data of FIG. 7. Thus, the image processing device 1 is capable of cutting out circumscribing rectangles obtained for each group of connected black pixels having the same label, in other words, separating areas as bundles of character strings, so that it can eliminate the problem of partially missing defective characters and conspicuous noises in character strings as experienced in the prior art, which cuts out areas by a specified block unit using an 8×8 DCT transformation matrix. Moreover, as shown in FIG. 8, it is also made possible to extract an image with a layout where circumscribing rectangles are overlapping with each other as shown in FIG. 9, by extracting circumscribing rectangles obtained by each connected group of black pixels having the same label as local areas.

Figure 10:
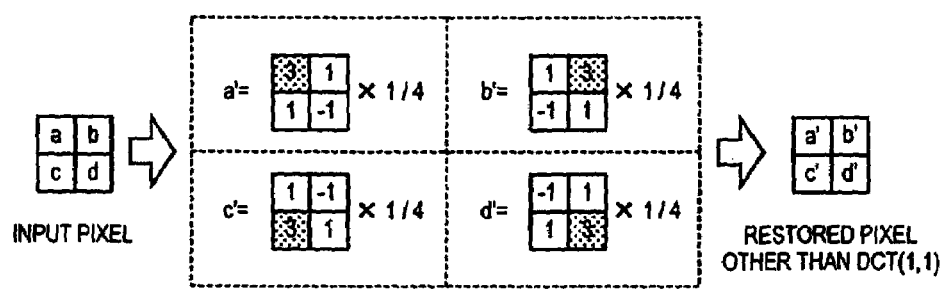
FIG. 10 is a diagram for describing the filtering process for deleting high frequency components from the characteristic frequency components of the input image data in the character image area separation procedure of the image processing device 1.
Figure 11:
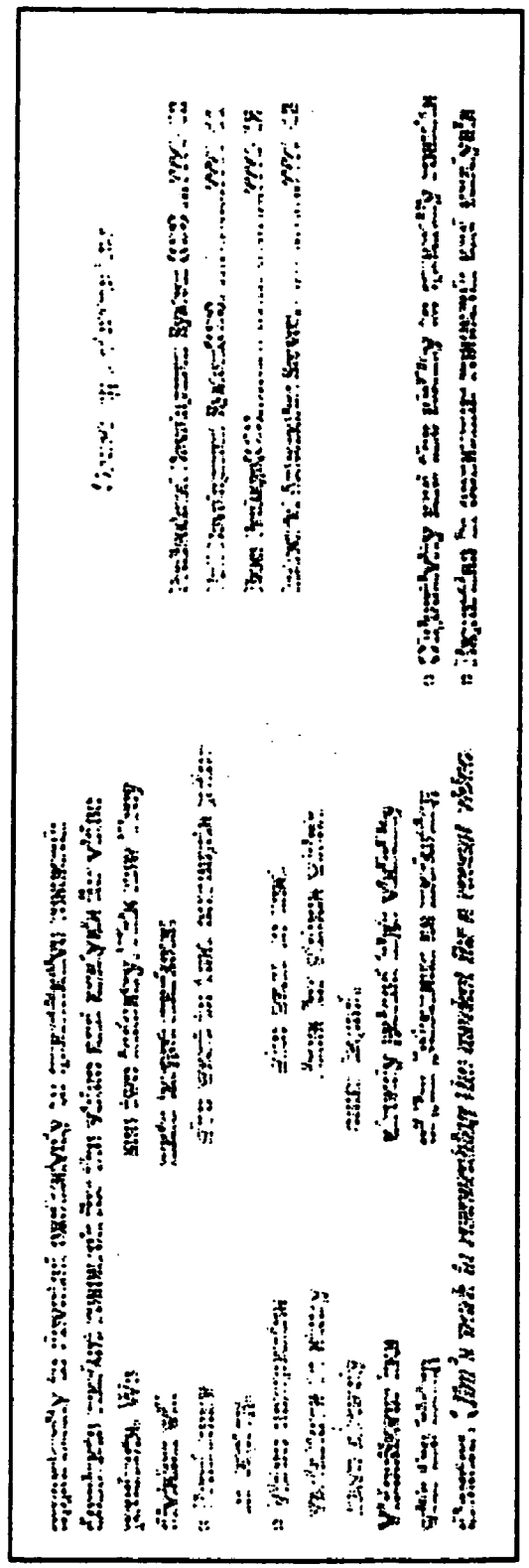
FIG. 11 is a diagram showing an example of diagonal direction edge component image data obtained by binarizing high frequency components extracted from the same input image data as in FIG. 6.

Next, it extracts diagonal direction edge components that belong to each local area from the input image data (S206), and identifies a local area whose diagonal direction edge component content is within a specified range as a character image area (S207). In a document image, a character image area typically contains a larger amount of diagonal direction edge components within a narrow area compared to graphic, photographic, ruled line, and other image areas. Therefore, it is possible to make a judgment whether a local area is a character image area by extracting diagonal direction edge components as the characteristic frequency component specific to a character image area and calculating its content. This is due to the fact that, if the connected black pixels contained in a local area are character image constituting pixels, said local area becomes the circumscribing rectangular area of a character string and the content of diagonal direction edge components of the input image data contained in said local area becomes within the specified range. The extraction of such diagonal direction edge components is equivalent to the process of extracting high frequency components of the characteristic frequency components according to 2×2 DCT (discrete cosine transformation). In other words, first, the DCT transformation according to a 2×2 matrix is applied to the input image data by means of filtration process as shown in FIG. 10, and the reverse DCT transformation is applied to the resultant characteristic frequency components assuming the high frequency component among is zero to obtain the restored image data void of high frequency components. The high frequency components of the input image data can then be obtained as the difference between the input image data and the restored image data. FIG. 11 shows an example of diagonal direction edge component image data obtained by binarizing high frequency components extracted from the input image data of FIG. 6. If a local area is a character image area, the content of diagonal direction edge components of a local area, i.e., the ratio of the total number of black pixels of FIG. 11 that belong to said local area relative to the area of the local area becomes within the specified range (0.2%–20%), a local area where said ratio is within such a range is identified as a character image area.

Thus, while the prior art determines whether an extracted area is a character image area on the premise that the peripheral area of a character image is mono-chromatic and the majority of frequency components are direct current components, the image processing device 1 according to this embodiment extracts high frequency components of the characteristic frequency components based on the characteristic that a character image area contains a larger amount of diagonal direction edge components in a narrow area, so that the result is less likely to be affected by the peripheral area of a character image and a character image area can be correctly detected even if it is a character image on a complex color area reproduced by a screen, etc. Moreover, while the prior art extracts characteristic frequency components based on the 8×8 DCT transformation, the image processing device 1 extracts characteristic frequency components by means of the 2×2 DCT transformation, so that it is extremely advantageous in terms of the process speed as well.

Figure 12:
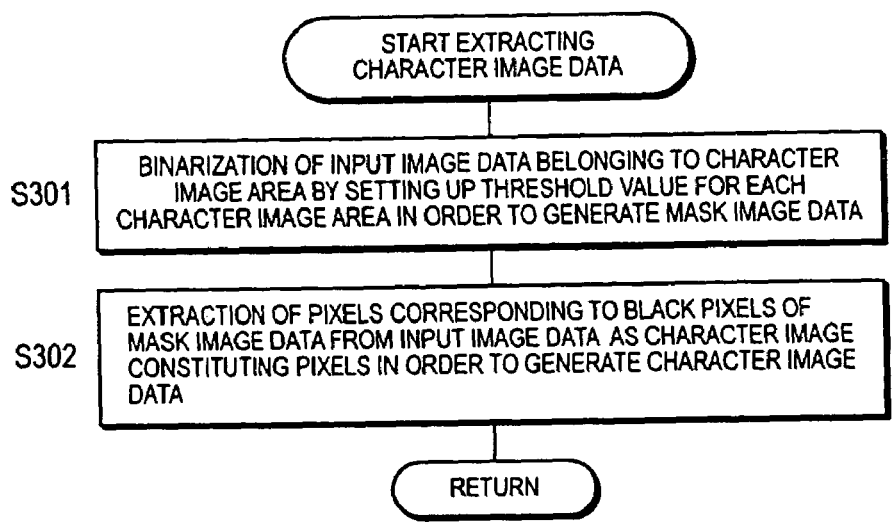
FIG. 12 is a flowchart showing the text image data extraction procedure of the image processing device 1.
Figure 13A:
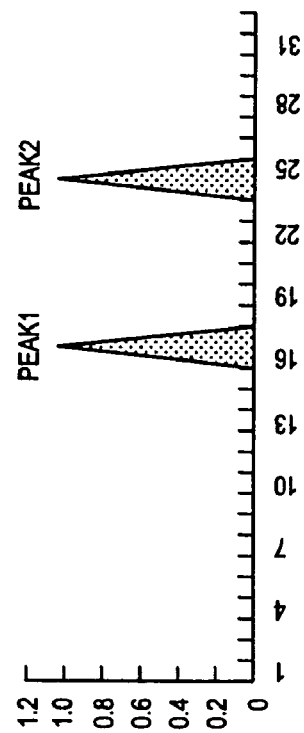
FIG. 13 is a diagram showing an example of a brightness histogram and a peak detection histogram generated from the input brightness image data belonging to the character area in the character image data extraction procedure of the image processing device 1.
Figure 13B:
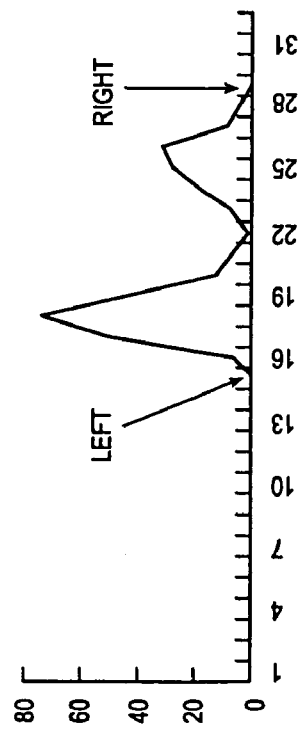

Next, the character image data extraction procedure of the image processing device 1 will be described below. FIG. 12 is a flowchart showing the character image data extraction procedure of the image processing device 1. In the character image data extraction procedure, the image processing device 1 extracts the character image data consisting only of character image constituting pixels from a character image area separated from the aforementioned character area separation procedure of the input image data. In other words, in FIG. 12, the image processing device 1 binarizes the input image data belonging to the character image areas separated in the aforementioned character image area separation procedure by specifying a threshold value for each character image area (S301). As a method of specifying a threshold value for each character image area, the following method can be used. First, a brightness histogram is generated for each character image area as shown in FIG. 13(a) using brightness image data of the input image data belonging to said character image area. Next, the brightness histogram is transformed into percentage relative to the number of pixels within said character image area to be processed with quadratic differentiation. A histogram for peak detection is generated to detect peaks by outputting 1, if the result of the quadratic differentiation is higher than a specified value, or 0, if it is lower than the specified value, as shown in FIG. 13(b). The threshold value is determined as the median value of the peaks at both ends if the number of peaks is 2 or more, or the average of the peak value and the left and right side rising values of said brightness histogram (Left and Right values shown in FIG. 13(a)) if the number of peaks is 1, or the median value of said left and right rising values of said brightness histogram if the number of peaks is zero. After performing binarization using the threshold value obtained for each character image area, a mask image data such as shown in FIG. 14 is generated by extracting the black pixels of the obtained binary image data. Thus, the image processing device 1 can provide binarization even for characters on background or reverse video characters without causing problems such as partially missing defective images as it conducts binarization using threshold values varying with the number of peaks of the brightness histogram within the character image area.

Next, a character image data as shown in FIG. 15 is generated by extracting pixels corresponding to the black pixels of the mask image data obtained from the input image data as character image constituting pixels (S302).

Figure 16:
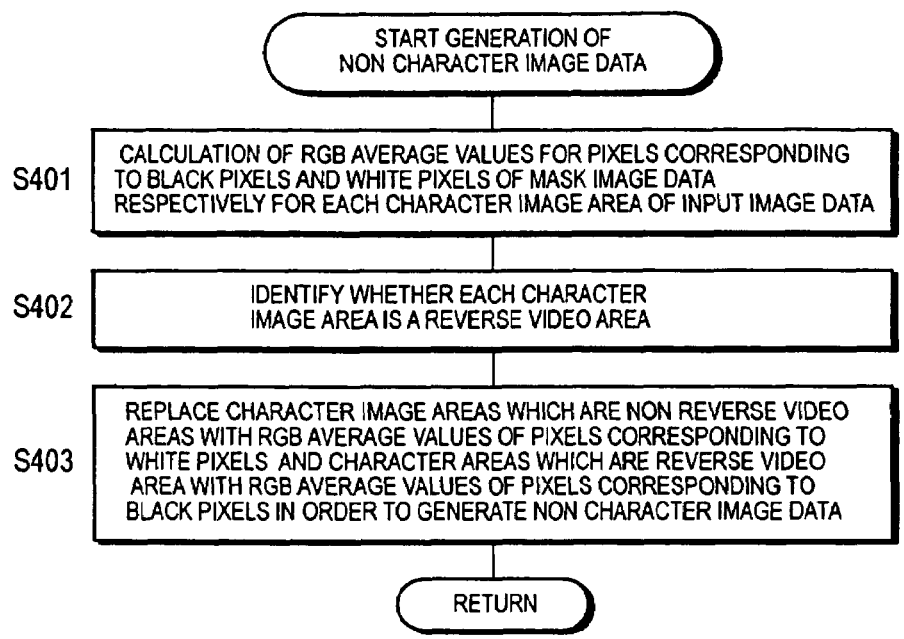
FIG. 16 is a flowchart showing the non-character image data generating procedure of the image processing device 1.

Next the non-character image data generating procedure of the image processing device 1 is described. FIG. 16 is a flowchart showing the non-character image data generating procedure of the image processing device 1 in this embodiment. In the non-character image data generating procedure, the image processing device 1 generates non-character image data by replacing character image constituting pixels extracted according to said character image data extraction procedure with peripheral pixels. In other words, as shown in FIG. 16, the image processing device 1 obtains the RGB average values 1 (R1, G1, B1) of the pixels that correspond to the black pixels of the mask image data and the RGB average values 2 (R2, G2, B2) of the pixels that correspond to the white pixels of the mask image data generated in the procedure of the step S301 for each character image area of the input image data (S401).

Figure 17:
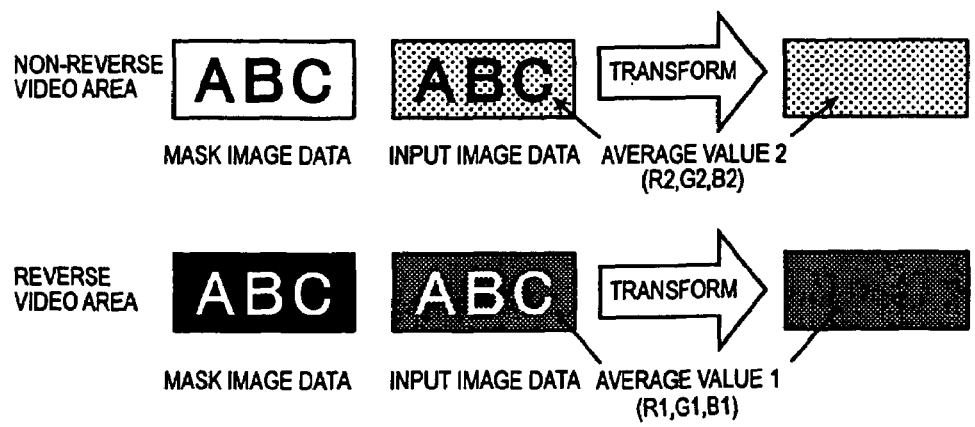
FIG. 17 is a conceptual drawing for describing the process of replacing the character image constituting pixels in the character image area of the input image data with peripheral pixels in the non-character image data generating procedure of the image processing device 1.
Figure 18:
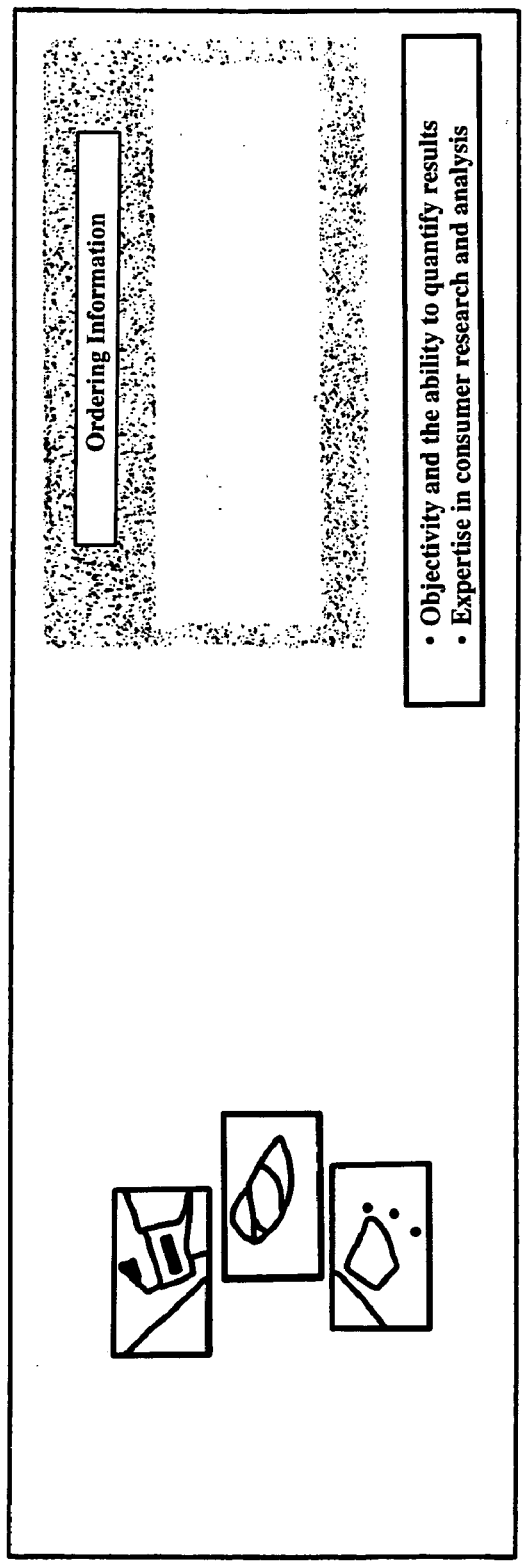
FIG. 18 is a diagram showing an example of non-character image data generated by replacing the character image constituting pixels in the character image area of the input image data with peripheral pixels in the non-character image data generating procedure of the image processing device 1.

Next, it identifies whether a particular character image area is a reverse video area or non-reverse video area (S402). As a method of identifying a reverse video area, it can measure the number of black pixels located on a rectangular area circumscribing said character image area of the mask image data, and determine that said character image area is a reverse video area if the number of black pixels is more than two thirds of the total number of pixels on the circumscribing rectangle. As shown in FIG. 17, said character image area is entirely replaced with the average value 2 (R2, G2, B2) if the character image area is a non-reverse video area, or said character image area is entirely replaced with the average value 1 (R1, G1, B1) if the character image area is a reverse video area, in order to generate the non-character image data as shown in FIG. 18 (S403).

In the embodiment described above, a particular local area is determined whether it is a character image area by means of extracting diagonal direction edge components, which are the frequency components characteristic to a character image area, from a very small local area extracted as a rectangle area circumscribing a connecting edge group of pixels of edge image data, and calculating the content of said components. However, the present invention is applicable, not just to such a local area, but also to an arbitrary object area, and to identify whether such an object area is a character image containing area that contains mainly character images by finding the content of diagonal direction edge components for said arbitrary object area. In other words, in image processing of an area containing character images, there are cases where it is sufficient to extract character image data not necessarily as an area containing only character images but also as a character image containing area that contains mainly character images, and the image processing for character image data can be simply and quickly done by applying image processing suitable for character images to a character image containing area extracted as described above.

In the image processing of character image data, the following can be mentioned as an example of the object area to which the separation method for the character image containing area according to the present invention can be applied. First, one of the aforementioned object areas is a rectangle area circumscribing a group of edge pixels whose distances between edge pixels in a specified direction and also in a direction perpendicular to said specified direction of the edge image data obtained from said input image data are less than a specified number of pixels. In this case, the method of generating the edge image data is not limited to the aforementioned method of using the binarization process with a variable threshold value, but rather a method of extracting edge components by detecting the gradient of brightness data using a differential filter of 5×5 (JP-A-2000-307869) and the like can be used as well. Moreover, the method of extracting the diagonal direction edge components is not limited to the aforementioned 2×2 DCT (discrete cosine transformation) method for detecting high frequency components, but also a method of identifying whether the edge components are diagonal direction edge components by means of conducting diagonal pattern matching using a 3×3 filter against the edge components of the object area (JP-A-10-145602) and the like can be used as well. When the content of the diagonal direction edge components determined as described above is within a specified range (0.2%–30%), said object area can be identified as a character image containing area that contains mainly character images.

Figure 19:
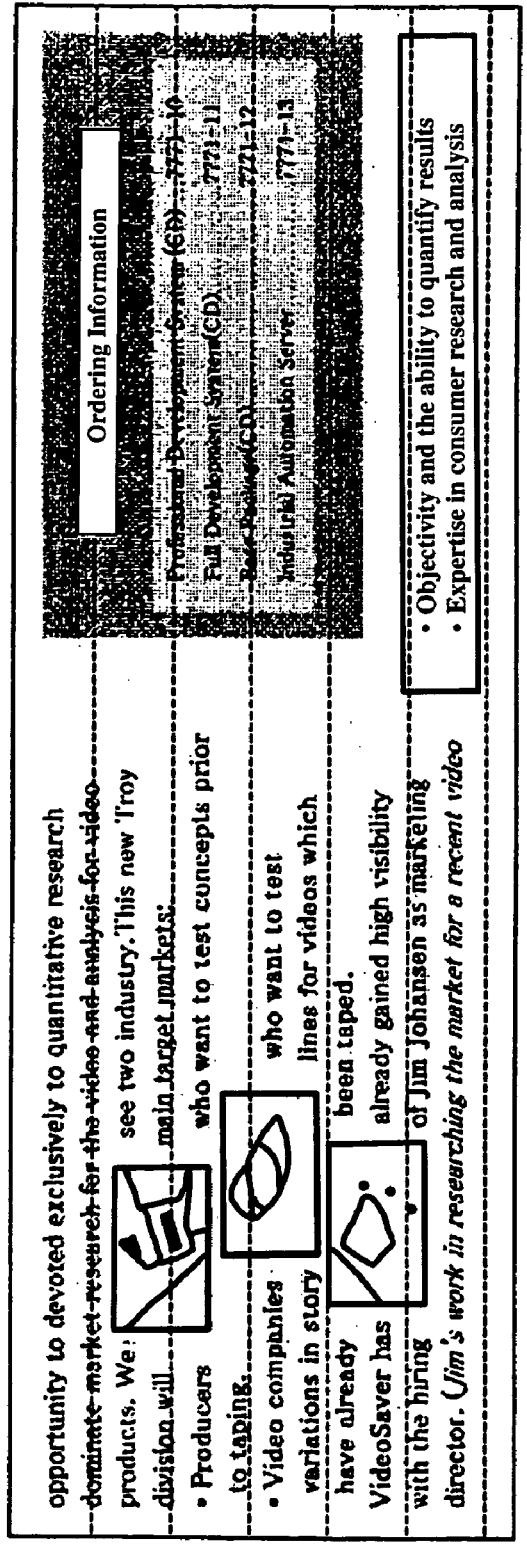
FIG. 19 is a diagram showing an example of setting blocks obtained by horizontally dividing the input image data of FIG. 6 with a specified width as the object area for identifying whether any character image is contained.
Figure 20:
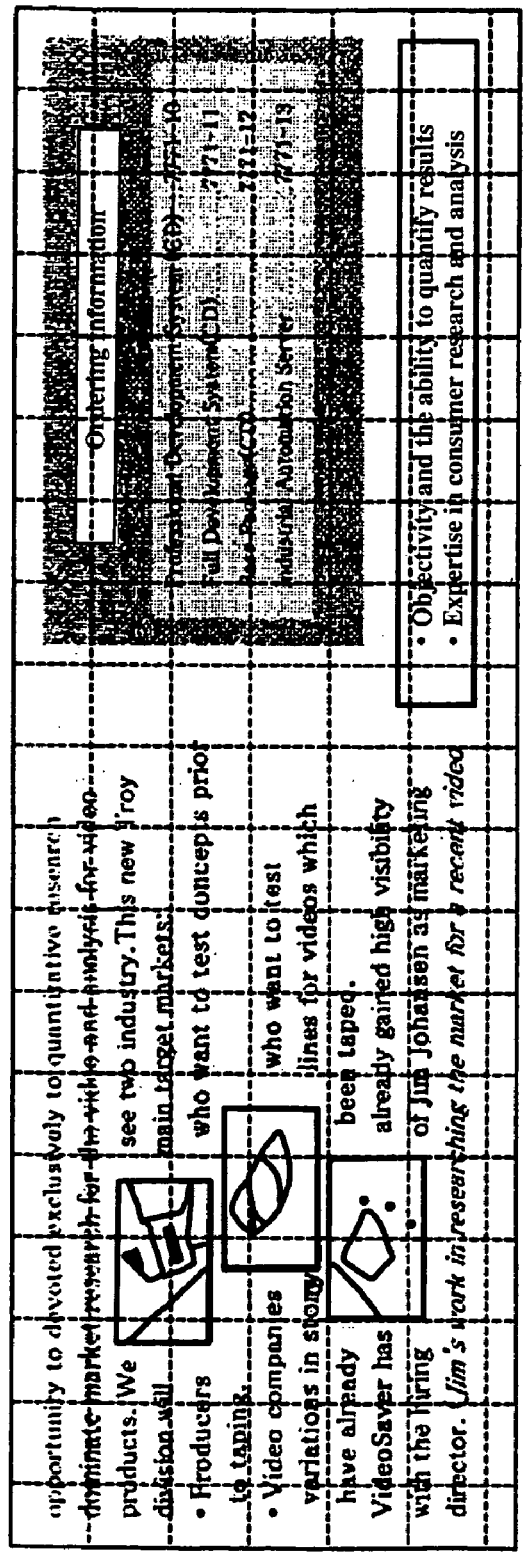
FIG. 20 is a diagram showing an example of setting blocks obtained by dicing the input image data of FIG. 6 as the object area for identifying whether any character image is contained.

Furthermore, the entire page of the input image data can be treated as the aforementioned object area. In such as case, when the number of pixels of the diagonal direction edge component image data as shown in FIG. 11 of the above-mentioned embodiment is 62370–748440 dots for image data of 300 dpi and A4 size (29.7 cm×21.0 cm), it can be judged that said object area is a character image containing area that contains mainly character images. Also, if the number of pixels of said diagonal direction edge component image data is 2100–25200 dots for a block with a width of 1 cm obtained from input image data of 300 dpi A4 size (29.7 cm×21.0 cm) page, which is divided horizontally into multiple blocks with a specified width as shown in FIG. 19; or if the number of pixels of said diagonal direction edge component image data is 100–1200 dots for a block of 1 cm×1 cm obtained from input image data of 300 dpi A4 size (29.7 cm×21.0 cm) page, which is divided by dicing the input image data as shown in FIG. 20, it can be judged that said object area is a character image containing area that contains mainly character images.

The image processing device according to the present invention is not limited to the aforementioned embodiment, but rather it can be applied to image reading devices such as scanners, computers such as personal computers, workstations, and servers, multiple function peripheral devices (MFP) such as digital copying machines, facsimile machines, etc.

The image processing device and the image processing method according to the present invention can be implemented by a dedicated hardware circuit designed to execute the aforementioned procedures, or by a CPU executing a program on which the aforementioned procedures are written. In implementing the present invention in the latter case, the program for operating the image processing device can be provided by a computer readable medium such as a flexible disk or CD-ROM, or can be provided on-line via a network such as the Internet. In this case, the program recorded on a computer readable recording medium is typically transferred to and stored in a ROM or a hard disk. The program can be provided as an independent application software or can be built into the software of the image processing device as one of its functions.

As can be seen from the above, the image processing device of the present invention is capable of correctly identifying character image areas even in case of character images on complex color areas reproduced by a screen, etc., and also capable of extracting character image areas without causing any problems such as partially missing defective characters.

The image processing device according to the present invention is capable of extracting character image containing areas from input image data simply and quickly in accordance with a specified object area.

What is claimed is:

1. An image processing device comprising:
   an edge component extracting unit for extracting edge components of an image in a diagonal direction within a partial area of input image data;
   an edge component content ratio calculating unit for calculating the content ratio of said edge components within said partial area; and
   a character area identifying unit for identifying whether said partial area is an area containing character images based on the content ratio of said edge components.

2. The image processing device described in claim 1, wherein
   said character area identifying unit identifies said partial area as an area containing character images when the content ratio of said edge components is 0.2%–30%.

3. The image processing device described in claim 1, wherein
   said partial area in which said edge component extracting unit extracts edge components is an entire page of input image data.

4. The image processing device described in claim 1, wherein
   said partial area in which said edge component extracting unit extracts edge components is a block obtained by dividing a page of input image data into multiple blocks.

5. The image processing device described in claim 1, wherein
   said partial area in which said edge component extracting unit extracts edge components is a block obtained by dividing a page of input image data into multiple either vertical or horizontal blocks.

6. The image processing device described in claim 1, wherein
   said partial area in which said edge component extracting unit extracts edge components is a block obtained by dividing a page of input image data into multiple vertical and horizontal blocks.

7. The image processing device described in claim 1, wherein
   said partial area in which said edge component extracting unit extracts edge components is a rectangular area circumscribing a group of edge pixels whose distances between the edge pixels in a specified direction and a direction perpendicular to said specified direction of edge image data obtained from said input image data are less than a specified number of pixels.

8. The image processing device described in claim 1 further comprising:
   an edge image data generating unit for generating edge image data from the input image data;
   a connecting edge image data generating unit for generating connecting edge image data by measuring the distances between edge pixels in a main scanning direction and a secondary scanning direction of said edge image data and interpolating between the edge pixels with distances less than a specified number of pixels to form a group of connecting edge pixels; and
   a local area extracting unit for extracting a local area which is a rectangular area circumscribing said group of connecting edge pixels of said connecting edge image data; wherein,
   said partial area in which said edge component extracting unit extracts edge components is said local area of said input image data, and
   said character area identifying unit identifies whether said local area is an area containing only character images based on the content ratio of said edge components.

9. The image processing device described in claim 8, wherein
said character area identifying unit identifies said local area is an area containing only character images when the content ratio of said edge components is 0.2%–20%.

10. The image processing device described in claim 8 further comprising:
a character image data extracting unit for extracting character image data consisting only of pixels which constitute character image from a local area which is identified as an area containing only character images of said input image data.

11. The image processing device described in claim 8 further comprising:
a non-character image data generating unit for generating non-character image data by replacing character image constituting pixels contained in a local area which is identified as an area containing only character images of said input image data with peripheral pixels.

12. An image processing method comprising:
a step (1) of extracting edge components of an image having a diagonal direction within a partial area of input image data;
a step (2) of calculating the content ratio of said edge components within said partial area; and
a step (3) of identifying whether said partial area is an area containing character images based on the content ratio of said edge components.

13. The image processing method described in claim 12, wherein
said partial area is identified as an area containing character images in the step (3) when the content ratio of said edge components is 0.2%–30%.

14. The image processing method described in claim 12, wherein
said partial area in which edge components are extracted in the step (1) is an entire page of input image data.

15. The image processing method described in claim 12, wherein
said partial area in which edge components are extracted in said step (1) is a block obtained by dividing a page of input image data into multiple blocks.

16. The image processing method described in claim 12, wherein
said partial area in which edge components are extracted in the step (1) is a block obtained by dividing a page of input image data into multiple either vertical or horizontal blocks.

17. The image processing method described in claim 12, wherein
said partial area in which edge components are extracted in the step (1) is a block obtained by dividing a page of input image data into multiple vertical and horizontal blocks.

18. The image processing method described in claim 12, wherein
said partial area in which edge components are extracted in the step (1) is a rectangular area circumscribing a group of edge pixels whose distances between the edge pixels in a specified direction and a direction perpendicular to said specified direction of edge image data obtained from said input image data are less than a specified number of pixels.

19. The image processing method described in claim 12 further comprising:
a step (4) of generating edge image data from the input image data;
a step (5) of generating connecting edge image data by measuring the distances between edge pixels in a main scanning direction and a secondary scanning direction of said edge image data and interpolating between the edge pixels with distances less than a specified number of pixels to form a group of connecting edge pixels; and
a step (6) of extracting a local area which is a rectangular area circumscribing said group of connecting edge pixels of said connecting edge image data; wherein,
said partial area in which edge components are extracted in the step (1) is said local area of said input image data, and
the step (3) is for identifying whether said local area is an area containing only character images based on the content ratio of said edge components.

20. The image processing method described in claim 19, wherein
said partial area is identified as an area containing only character images in the step (3) when the content ratio of said edge components is 0.2%–20%.

21. The image processing method described in claim 19 further comprising:
a step (7) of extracting character image data consisting only of pixels which constitute character image from a local area which is identified as an area containing only character images of said input image data.

22. The image processing method described in claim 19 further comprising:
a step (8) of generating non-character image data by replacing said character image constituting pixels contained in a local area which is identified as an area containing only character images of said input image data with peripheral pixels.

23. A computer readable recording medium having an image processing program for causing an image processing device to execute:
a procedure (1) for extracting edge components of an image having a diagonal direction within a partial area of input image data;
a procedure (2) for calculating the content ratio of said edge components within said partial area; and
a procedure (3) identifying whether said partial area is an area containing character images based on the content ratio of said edge components.

24. The computer readable recording medium having an image processing program described in claim 23, wherein
said partial area is identified as an area containing character images in the procedure (3) when the content ratio of said edge components is 0.2%–30%.

25. The computer readable recording medium having an image processing program described in claim 23, wherein
said partial area in which edge components are extracted in the procedure (1) is an entire page of input image data.

26. The computer readable recording medium having an image processing program described in claim 23, wherein
said partial area in which edge components are extracted in said procedure (1) is a block obtained by dividing a page of input image data into multiple blocks.

27. The computer readable recording medium having an image processing program described in claim 23, wherein
said partial area in which edge components are extracted in the procedure (1) is a block obtained by dividing a page of input image data into multiple either vertical or horizontal blocks.

28. The computer readable recording medium having an image processing program described in claim 23, wherein
said partial area in which edge components are extracted in the procedure (1) is a block obtained by dividing a page of input image data into multiple vertical and horizontal blocks.

29. The computer readable recording medium having an image processing program described in claim 23, wherein
said partial area in which edge components are extracted in the procedure (1) is a rectangular area circumscribing a group of edge pixels whose distances between the edge pixels in a specified direction and a direction perpendicular to said specified direction of edge image data obtained from said input image data are less than a specified number of pixels.

30. The computer readable recording medium having an image processing program described in claim 23 further causing the image processing device to execute:
a procedure (4) for generating edge image data from the input image data;
a procedure (5) for generating connecting edge image data by measuring the distances between edge pixels in a main scanning direction and a secondary scanning direction of said edge image data and interpolating between the edge pixels with distances less than a specified number of pixels to form a group of connecting edge pixels; and
a procedure (6) for extracting a local area which is a rectangular area circumscribing said group of connecting edge pixels of said connecting edge image data; wherein,
said partial area in which edge components are extracted in the procedure (1) is said local area of said input image data, and
the procedure (3) is for identifying whether said local area is an area containing only character images based on the content ratio of said edge components.

31. The computer readable recording medium having an image processing program described in claim 30, wherein
said partial area is identified as an area containing only character images in the procedure (3) when the content ratio of said edge components is 0.2%–20%.

32. The computer readable recording medium having an image processing program described in claim 30 further causing the image processing device to execute:
a procedure (7) for extracting character image data consisting only of pixels which constitute character image from a local area which is identified as an area containing only character images of said input image data.

33. The computer readable recording medium having an image processing program described in claim 30 further causing the image processing device to execute:
a procedure (8) for generating non-character image data by replacing character image constituting pixels contained in a local area which is identified as an area containing only character images of said input image data with peripheral pixels.

* * * * *